US011323859B2

(12) United States Patent
Szilagyi et al.

(10) Patent No.: US 11,323,859 B2
(45) Date of Patent: May 3, 2022

(54) VEHICULAR MESSAGE DELIVERY

(71) Applicant: NOKIA TECHNOLOGIES OY, Espoo (FI)

(72) Inventors: Peter Szilagyi, Budapest (HU); Csaba Vulkán, Budapest (HU)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/764,183

(22) PCT Filed: Nov. 15, 2017

(86) PCT No.: PCT/EP2017/079253
§ 371 (c)(1),
(2) Date: May 14, 2020

(87) PCT Pub. No.: WO2019/096374
PCT Pub. Date: May 23, 2019

(65) Prior Publication Data
US 2020/0389772 A1    Dec. 10, 2020

(51) Int. Cl.
H04W 72/04    (2009.01)
H04W 4/44    (2018.01)
H04W 4/06    (2009.01)

(52) U.S. Cl.
CPC .............. *H04W 4/44* (2018.02); *H04W 4/06* (2013.01)

(58) Field of Classification Search
CPC ... G08G 1/00; H04L 5/00; H04L 1/18; H04W 72/04; H04W 4/40; H04W 72/12;
(Continued)

(56) References Cited

U.S. PATENT DOCUMENTS 7,558,587 B2 *   7/2009 Albal ................. H04W 72/005
370/326
8,644,207 B1    2/2014 Vivanco et al.
(Continued)

FOREIGN PATENT DOCUMENTS

CN    103650608 A    3/2014
CN    104918297    *    9/2015
(Continued)

OTHER PUBLICATIONS

International Search Report and Written Opinion dated Jul. 3, 2018 corresponding to International Patent Application No. PCT/EP2017/079253.

(Continued)

*Primary Examiner* — Quan M Hua
(74) *Attorney, Agent, or Firm* — Squire Patton Boggs (US) LLP

(57) ABSTRACT

Apparatuses and methods in a communication system are provided. The solution for transmitting a message for multiple vehicular recipients comprises determining (200) the vehicular recipients of the message in one or more coverage areas; estimating (202) the amount of resources needed in transmission the message using broadcast or separate unicast messages or the number of vehicular recipients that cannot receive broadcast message, or both, and transmitting (204) the message either as a single broadcast message to the vehicular recipients in each coverage area or as a unicast message separately to each vehicular recipient or both, depending on the amount of resources needed in transmission or the number of vehicular recipients that cannot receive the broadcast message, or both.

14 Claims, 4 Drawing Sheets

Figure 1:
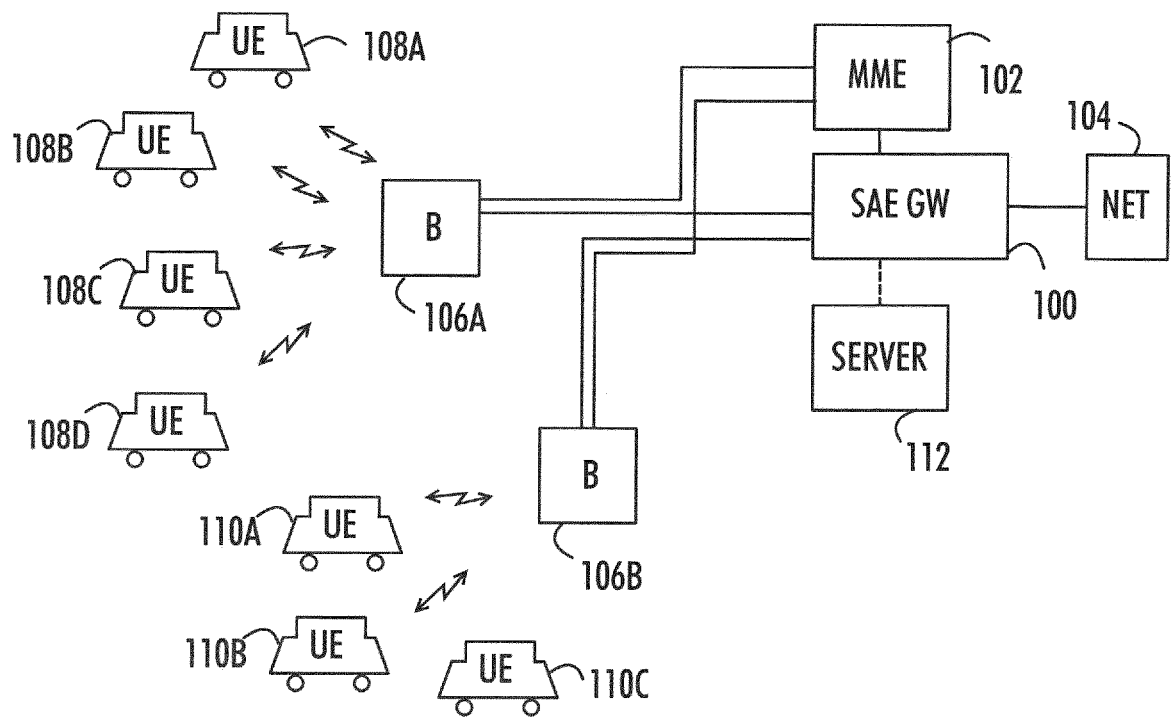

(58) Field of Classification Search
CPC ....... H04W 4/46; H04W 24/10; H04W 72/14;
H04W 28/02; H04W 4/70; H04W 28/08;
H04W 36/14; H04W 4/08; H04W 76/15;
H04W 4/00; H04W 36/30; H04W 48/10;
H04W 48/16; H04W 72/02; H04W 88/06;
H04W 24/02; H04W 4/02; H04W 48/18;
H04W 52/40; H04W 52/58; H04W 74/08;
H04W 76/27
See application file for complete search history.

(56) References Cited

U.S. PATENT DOCUMENTS

| | | | | |
|---|---|---|---|---|
| 2005/0160181 | A1* | 7/2005 | Kwon | H04L 1/0002 709/238 |
| 2013/0336111 | A1* | 12/2013 | Vos | H04L 41/08 370/230 |
| 2016/0380853 | A1* | 12/2016 | Lotfallah | H04L 12/6418 709/224 |
| 2017/0353777 | A1* | 12/2017 | Mach | G08B 21/12 |
| 2018/0049224 | A1* | 2/2018 | Dinan | H04W 72/1289 |
| 2018/0279275 | A1* | 9/2018 | Chen | H04W 76/14 |
| 2018/0295628 | A1* | 10/2018 | Lu | H04L 5/0058 |

FOREIGN PATENT DOCUMENTS

| | | |
|---|---|---|
| CN | 105282257 A | 1/2016 |
| CN | 106302622 A | 1/2017 |
| CN | 107333313 A | 11/2017 |
| EP | 3 310 118 A1 | 4/2018 |
| WO | WO 2016/197622 A1 | 12/2016 |

OTHER PUBLICATIONS

ZTE: "Some considerations on multi-cell mullicast/broadcast for V2X," 3GPP Draft; R2-154701, 3GPP TSG RAN WG2 #91bis, Malmo, Sweden, Oct. 4, 2015, XP051005202.
International Preliminary Report on Patentability dated Jan. 31, 2020 corresponding to International Patent Application No. PCT/EP2017/079253.
Notification of the First Office Action dated May 27, 2021 corresponding to Chinese Patent Application No. 2017800968457, with English Summary.
Communication pursuant to Article 94(3) EPC dated Sep. 7, 2021 corresponding to European Patent Application No. 17800822.3.
Notification of Second Office Action dated Dec. 17, 2021 corresponding to Chinese Patent Application No. 2017800968457, with English summary thereof.

* cited by examiner

VEHICULAR MESSAGE DELIVERY

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are under constant development. Wireless communication amongst vehicles has been under study during recent years. It has been estimated that development of Intelligent transportation systems, ITS, will improve road safety and traffic efficiency. Communication between vehicles and between infrastructure is a vital part of ITS. Vehicle-to-vehicle communication, V2V, and vehicle-to-infrastructure communication, V2I, will enable communication related to various use cases, such as broadcasting situation awareness messages for assisted driving, sending emergency alerts (braking and vulnerable road user detection, for example) to increase safety, executing cooperative manoeuvres such as lane merging or platooning and more.

Vehicular connectivity over cellular technology, such as cellular system developed by Third Generation Partnership Project, 3GPP, is denoted as Cellular Vehicle to Everything, C-V2X. It is being standardized starting with the communication systems under development such as Long Term Evolution Advanced, LTE-A and its evolution into 5G. In vehicle to infrastructure, V2I, vehicles are connected to base stations of a communication system and the vehicles exchange data with backend servers or other vehicles through the radio access network of the communication system (as opposed to device-to-device communication, where the data is exchanged directly between the terminals without going through the network).

There is a need to define a method how information may be transmitted both reliably and efficiently regarding the use of communication system resources.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided methods of claims 1 and 33.

According to an aspect of the present invention, there is provided an apparatus of claim 34.

LIST OF DRAWINGS

Figure 5A:
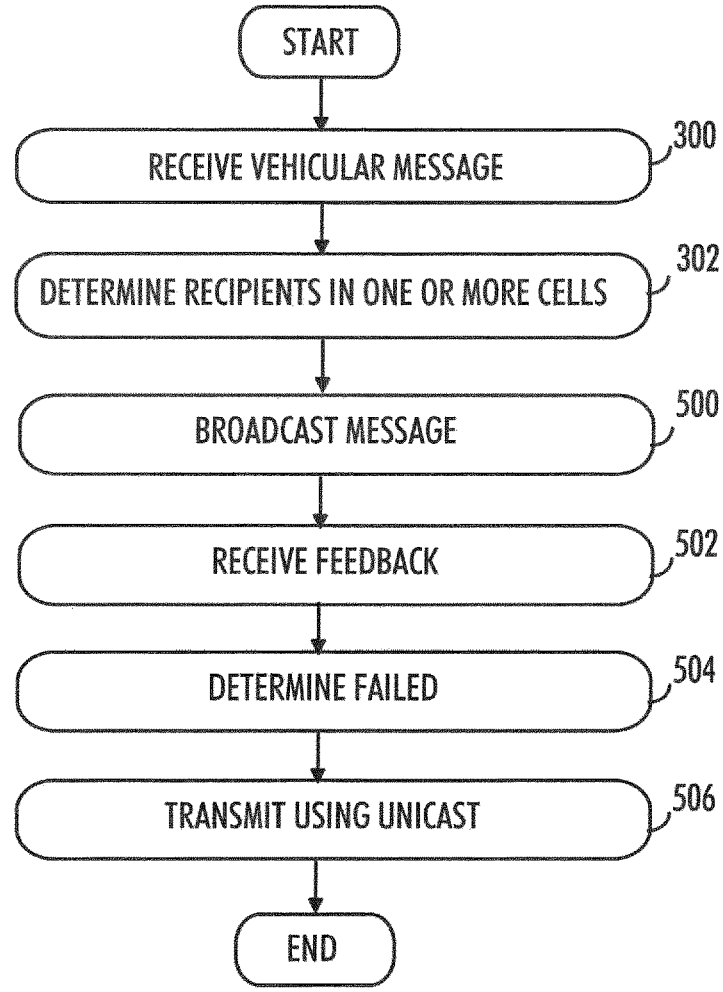
Figure 4:
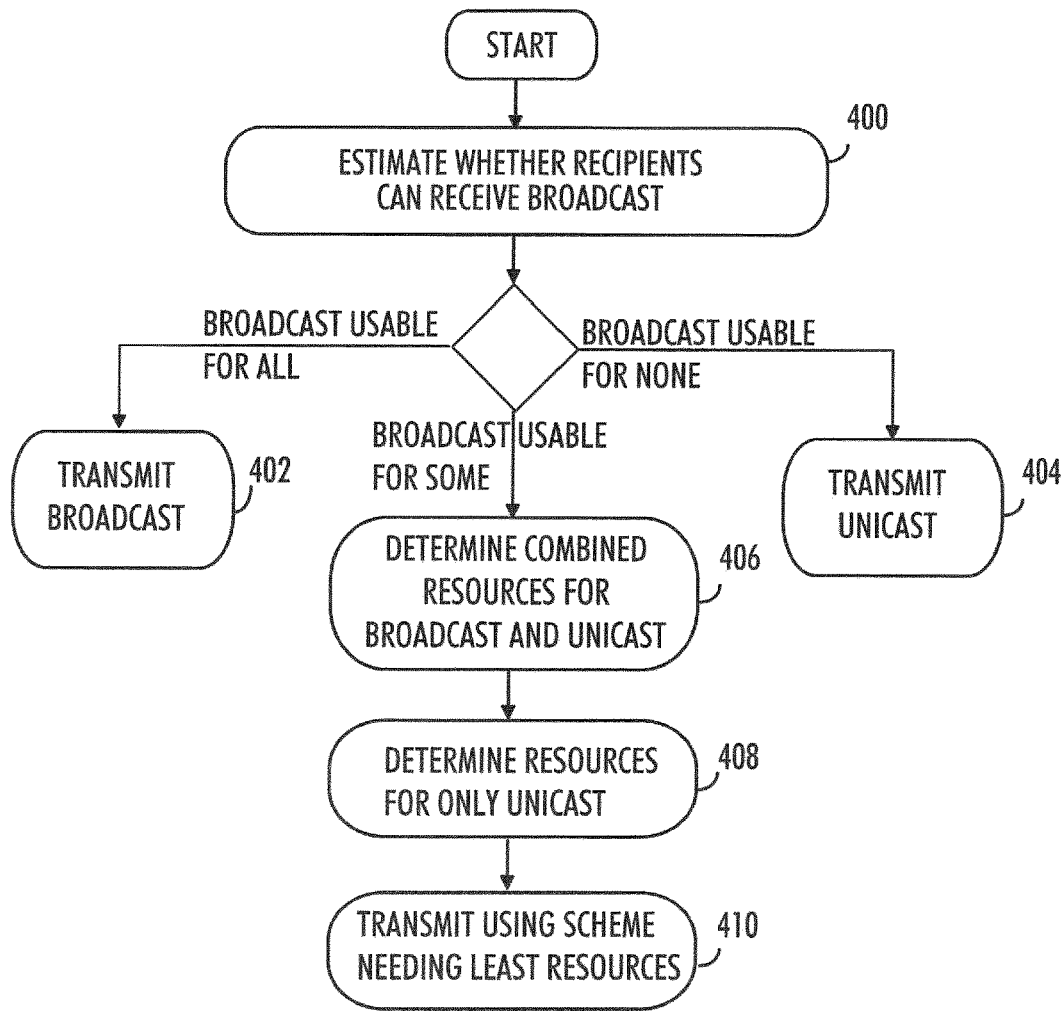
Figure 5B:
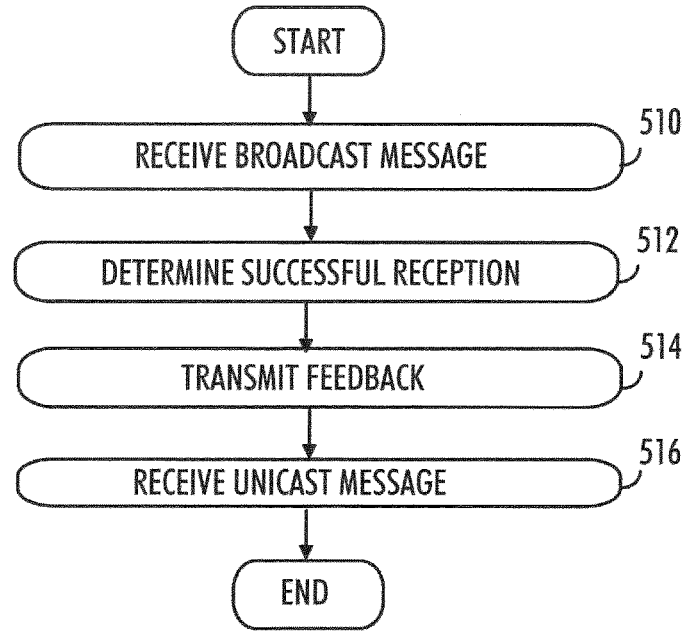
Figure 6:
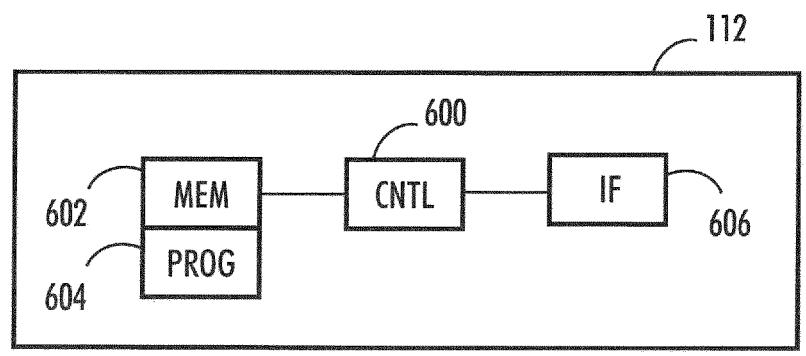
Figure 7:
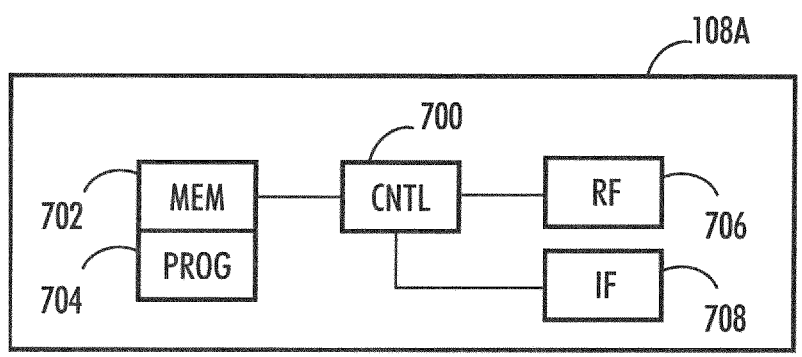

Embodiments of the present invention are described below, by way of example only, with reference to the accompanying drawings, in which FIG. 1 illustrates an example of a communication environment where some embodiments of the invention may be applied FIGS. 2, 3, 4, 5A and 5B are flowcharts illustrating embodiments of the invention; and FIGS. 6 and 7 illustrate simplified examples of apparatuses applying embodiments of the invention.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Some embodiments of the present invention are applicable to, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN), HSPA (High Speed Packet Access), long term evolution (LTE®, known also as evolved UMTS Terrestrial Radio Access Network E-UTRAN), long term evolution advanced (LTE-A), fifth generation cellular network, 5G. For example, 5G, LTE® and LTE-A are developed by the Third Generation Partnership Project 3GPP.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 comprises a System Architecture Evolution SAE Gateway 100 and a Mobility Management Entity MME 102. The SAE Gateway 100 provides a connection to Internet 104.

FIG. 1 shows two base stations or eNodeBs 106A, 106B each serving a cell. In this example, the eNodeBs 106A, 106B are connected to the SAE Gateway 100 and the MME 102.

The eNodeBs (Enhanced node Bs) of a communication system may host the functions for Radio Resource Management: Radio Bearer Control, Radio Admission Control, Connection Mobility Control, Dynamic Resource Allocation (scheduling). The MME (Mobility Management Entity) is responsible for the overall user terminal control in mobility, session/call and state management with assistance of the eNodeBs through which the user terminals connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

The eNodeB 106A, 106B may provide radio coverage to a cell. The cell may be a macrocell, a microcell, or any other type of cell where radio coverage is present. Further, the cell may be of any size or form, depending on the antenna system utilized. An eNodeB may be used in order to provide radio coverage to the cell. The eNodeB 106A may control cellular radio communication links established between the eNodeB 106A and terminal devices or user equipment 108A, 108B, 108C, 108D located within the cell served by the eNodeB 106A. Respectively, the eNodeB 106B may control cellular radio communication links established between the eNodeB 106B and user terminals or user equipment 110A, 110B, 110C, 110D located within the cell served by the eNodeB 106A.

It may be noted that the radio access network may be realised using distributed computing where the functionalities of any single entity described in FIG. 1 may be realised using more than one physical apparatus or entity. Also virtual networking may be utilised. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer.

The user terminals may comprise Universal Subscriber Identity Module (USIM) or Subscriber Identity Module (SIM). USIM/SIM is an application which may be stored on a card inserted to the user terminal or on a chip embedded in the terminal and which comprises information on subscriber identity, authentication, accounting and security. USIM/SIM data is used for accessing services provided by communication systems.

The user terminal may be user equipment of a cellular communication system installed in a vehicle and provide the vehicle ability to communicate using V2I with suitable infrastructure responsible for ITS, for example. The user terminal may also a computer (PC), a laptop, a handheld computer, a mobile phone, or any other user terminal or user equipment capable of communicating with the cellular communication network.

In the example of FIG. 1, the infrastructure comprises a server 112 which is operatively connected to the SAE Gateway 110. Embodiments of the invention can be implemented in an LTE eNodeB, 5G gNodeB, edge cloud (such as Multi-Access Edge Computing platform) or in any physical network function PNF or virtual network function VNF where the network handles the Vehicle to Everything, V2X, message delivery.

Infrastructure based vehicular communication may include both unicast uplink vehicular message delivery from vehicles to the cellular network (V2I) and unicast or broadcast downlink message delivery from the network to vehicles (I2V). A number of standardized messages that each connected vehicle exist, including Cooperative Awareness Messages, CAM, that may be generated periodically with a pre-defined frequency (such as 10 times per second, for example) and carry the current position, speed, acceleration, etc. of the originating vehicle. There are also Decentralized Environmental Notification Messages, DENM, that are generated on demand in case an event happens (such as an emergency braking). In ITS, these messages are supposed to be conveyed from the originating vehicle to all nearby vehicles that are within a pre-defined geographical radius of the source. The number of vehicles that need to receive a given message as well as the load generated by I2V traffic may thus be dynamic as they depend on the physical proximity and density of the vehicles. The end-to-end delay from vehicle source to destination ranges typically from 20 ms to 100 ms. Thus, the communication network should be able to receive, process and transmit a message from the source to all destinations within this time window.

Unicast message delivery requires the existence of a communication channel such a data radio bearer, DRB, either default or dedicated, to transfer data exclusively between a given user terminal (vehicle) and the radio access node (such as LTE eNB). The radio functions associated with a DRB usually include Media Access Layer Hybrid Automatic Repeat request, MAC HARQ, and Radio Link Control Acknowledged Mode, RLC AM, that ensure the successful delivery of the data over the radio interface with very high probability. Additionally, the eNBs may use adaptive modulation and coding with channel feedback to make sure the robustness of the channel coding matches the capabilities of the radio channel.

In LTE based systems, 3GPP has defined some broadcast/multicast services such as Single Cell Point-to-Multipoint, SC-PTM, and Evolved Multimedia Broadcast Multicast Services, eMBMS. The SC-PTM uses the Physical Downlink Shared Channel, PDSCH, so that it is able to schedule broadcast data together with other dedicated data, which makes it efficient for broadcasting highly variable amount of data like vehicular messages (instead of reserving dedicated resources for broadcasting that may not be utilized fully). Broadcast message delivery is efficient in resources as the eNB uses a common set of radio resources (Physical Resource Blocks, PRBs) to transmit a piece of data in a cell that is decoded by a multitude or all of user terminals in the same cell, conveying the same information to any number of receivers without separate resource overhead per user terminal.

While using broadcast for vehicular messages is a radio resource efficient mechanism to distribute the same information to an arbitrary number of receivers, it has its potential drawbacks in terms of delivery success. Since the pre-coding of the broadcasted information cannot be customized for the individual downlink channel quality of every potential receiver, the eNB uses a single modulation and coding scheme, MCS, for encoding the broadcast information for all user terminals. Consequently, the chance of successful decoding a broadcasted message at a receiver after traversing the radio interface may be lower if the particular receiver has poorer channel quality than what the MCS used in transmitting the broadcast message was constructed for. As the eNB does not receive individual channel feedback from broadcast receivers, the eNB may select to use a robust modulation and coding scheme (such as QPSK with turbo code rate 1/3) that is decodable with reasonable likelihood under usual radio propagation circumstances. However, this may reduce the broadcast resource efficiency as it requires significant amount of physical resources. Using less robust but more efficient MCS (such as 16QAM) improves broadcast efficiency but may lead to a situation where a part of the user terminals will not be able to decode the broadcast message.

An additional problem with broadcast messages is the lack of MAC HARQ and RLC AM retransmissions. Even the most robust (and thus less efficient) MCS is more prone to decoding errors in a broadcast transmission than the same MCS in unicast transmission: with broadcast, each user terminal has to decode the broadcasted data at the first (and only) reception opportunity, whereas with unicast the transmission benefits from low layer retransmissions with incremental redundancy. This difference is especially pronounced for high speed vehicular receivers that are more prone to Doppler shift, multipath propagation and other degrading radio effects, and they also more frequently become located at cell edges with higher handover intensity and with poorer reception capability. Therefore, no matter how the broadcast MCS is selected at the eNB, some vehicular terminal may still be unable to decode broadcast information from time to time. This may lead to vehicular function degradation in case the vehicles operation depends on the timely and lossless arrival of messages. Thus, using only broadcast in C-V2X for delivering vehicular messages to all nearby vehicles may lead to degradations.

Using separate unicast messages for each vehicular recipient instead of broadcast delivery to every vehicle can provide the required level of reliability as the message transfer can benefit from the individual terminal specific downlink channel adaptation and MAC HARQ and RLC AM. However, using unicast inflates the amount of radio resources required to convey the same piece of information to all vehicular recipients. The actual overhead of unicast message delivery is context dependent and it may be significant in case there are a large number of vehicular recipients for the same message but may be acceptable in case there are relatively small number of vehicular recipients. It may be also noted that using broadcast is inherently prone to over-delivery, meaning that terminals not interested in the broadcasted information also receive it (and have to use computation resources to recognize and filter them out). In contrast, unicast may be precisely targeted to a specific set of interested vehicular recipients. Therefore, depending on the actual terminal population and context in a cell, the benefits of unicast may be worth the resource utilization they impose. However, currently there is no mechanism to adaptively and dynamically select whether in a given cell broadcast or unicast message transmission would be more beneficial for I2V, and there is also no mechanism to combine the two mechanisms.

Figure 2:
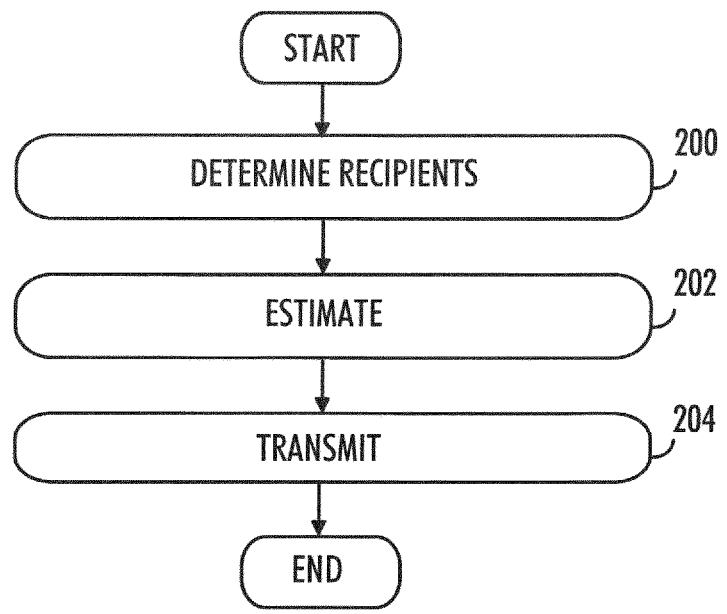

The flowchart of FIG. 2 illustrates an embodiment of a method for transmitting a message for multiple vehicular recipients. The proposed solution describes a novel mechanism for C-V2X systems to dynamically and adaptively combine cell level broadcast transmission and user terminal data radio bearer level unicast transmission schemes for delivering vehicular messages in downlink to multiple receivers. The steps may be executed by the server 112 of FIG. 1 or by another network entity (such as a radio access network node like LTE eNodeB or 5G gNodeB (such as 106A or 106B in FIG. 1), a processing device and application attached to the radio access network like an edge cloud or an in-line network element) or more than one entity in co-operation.

In step 200, the vehicular recipients of a message in one or more coverage areas are determined. The message may be a vehicular message received from a source vehicle via unicast transmission. The message may also be network generated. The vehicular recipients may be vehicles determined on the basis of the geographical location of the vehicles, belonging to one or more cells or belonging to a given group, for example.

In step 202, the server or network entity determines the amount of resources needed in transmission the message using broadcast or separate unicast messages or the number of vehicular recipients that cannot receive broadcast message, or both.

In an embodiment, the server or network entity may be configured to estimate the vehicular recipients than cannot receive the broadcast message prior transmitting the broadcast message.

In an embodiment, the server or network entity may be configured to perform radio channel estimation for each vehicular recipient and estimate the vehicular recipients than cannot receive the broadcast message on the basis of the radio channel estimation.

In an embodiment, the server or network entity may be configured to utilise channel feedback from vehicular recipients in obtaining radio channel estimation.

In an embodiment, the server or network entity may be configured to utilise channel feedback and quality of service information from other terminals using same transmission resources in the same coverage area in obtaining radio channel estimation.

In an embodiment, the server or network entity may be configured to determine information on location and mobility of each vehicular recipient and estimate the vehicular recipients than cannot receive the broadcast message on the basis of the location and mobility information.

In an embodiment, the server or network entity may be configured to estimate the vehicular recipients than cannot receive the broadcast message after transmitting the broadcast message.

Examples of above are described later in more detail.

In step 204, the server or network entity may be configured to transmit the message either as a single broadcast message to the vehicular recipients in each coverage area or as a unicast message separately to each vehicular recipient or both, depending on the amount of resources needed in transmission or the number of vehicular recipients that cannot receive the broadcast message, or both.

In an embodiment, transmitting the message using purely broadcast, purely unicast or simultaneous broadcast and selective unicast transmission is selected adaptively and proactively in a cell. This method may be denoted as proactive unicast as the need for unicast is evaluated prior transmission.

The proactive unicast method proposes an adaptive and proactive combination of cell level broadcast and terminal level unicast transmission schemes for network based (infrastructure based or V2I, I2V) vehicular message delivery to first maximize the resiliency (probability of message reception) and then maximize the efficiency (i.e., minimize resource utilization) of the transmission of each vehicular message.

In proactive unicast method, novel ways to evaluate the usability of broadcast for each potential vehicular recipient terminal are introduced even in the absence of terminal specific channel feedback for the resources used for broadcast.

In an embodiment, the message is sent using broadcast to all vehicular recipients followed by unicast as a second transmission to those vehicular recipients that reported a failure to successfully receive the broadcast transmission. This method may be denoted as reactive unicast as the need for unicast is evaluated after transmission.

The reactive unicast method, a combination of cell level broadcast and terminal level unicast transmission schemes are proposed, where the failure of receiving a broadcast message at a vehicular recipient triggers a second unicast retransmission of the message to the same vehicular recipient (instead of using repeated broadcast for retransmission).

In an embodiment, embodiments of the invention propose to benefit from the resource efficiency of broadcast by using common radio resources for delivering the same message to multiple vehicular recipients and at the same time increase resiliency by initiating additional unicast message transmissions for vehicular recipients that presumably will not be able to successfully decode the broadcast message or have explicitly reported failure to do so.

In an embodiment, the server or network entity may be configured to control eNodeB's of relevant cells to transmit the message.

Figure 3:
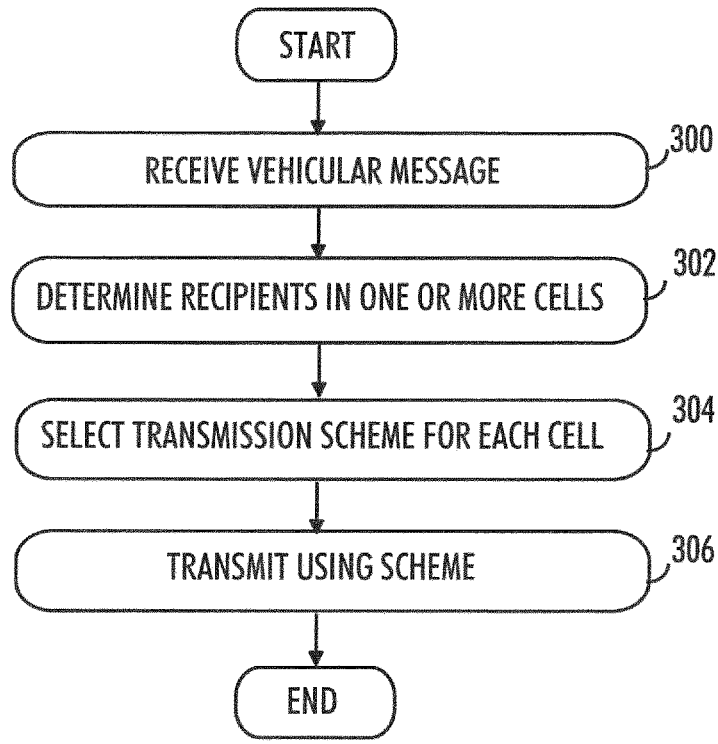

FIG. 3 is a flow chart illustrating an embodiment. FIG. 3 illustrates an example of proactive unicast method. In an embodiment, broadcast and unicast transmissions are used simultaneously in a cell to transfer a given message to a list of vehicular recipients.

In step 300, the apparatus or network element in a radio access network receives a message from a vehicular transceiver via unicast uplink transmission. The message may be CAM or DENM or any other kind of message.

In step 302, the apparatus or network element is configured to determine the vehicular recipients of a message in one or more coverage areas are determined. The coverage areas in question may comprise one or more cells of the radio access network, including the cell wherefrom the message originated. The vehicular recipients may be vehicles determined on the basis of the geographical location of the vehicles, belonging to one or more cells or belonging to a given group, for example. This step corresponds to step 200 of FIG. 2.

In step 304, the apparatus or network element is configured to select the transmission scheme of the message for each cell: cell level broadcast only, individual unicast for each vehicular recipient or a combination of cell level broadcast and unicast for a subset of vehicular recipients.

In an embodiment, the selection of the scheme to be used is performed separately for each cell and separately for each message.

An example of the selection of the transmission scheme is illustrated is the flow chart of FIG. 4. In an embodiment, the transmission scheme is selected so that the reliability of distributing the message to all target vehicular recipients is maximized while trying to keep the amount radio resources needed in the transmission per message low. Thus, broadcast is preferred to individual unicast unless the cost of unicast is not higher than broadcast and the reliability of the transmission is not compromised In step 400, the apparatus or network element is configured to, for each target vehicular recipient, estimate whether the vehicular recipient would likely be able to decode the message if it was broadcasted. The estimation may be performed for multiple broadcast MCS configurations (more robust coding requiring more resources, less robust coding requiring less resources). In an embodiment, the output is a binary decision for each target vehicular recipient (yes/no for broadcast per vehicle).

If for all target vehicular recipients broadcast method is usable, then the message is broadcasted 402 to be received by all target vehicular recipients.

If broadcast method is not usable for any of the target vehicular recipients, then the message is sent 404 for each target vehicular recipient using unicast.

If estimation indicates that some of the vehicular recipients can receive the broadcast message and some cannot, combined resources needed to transmit the message as a broadcast and as a unicast to each vehicular recipient that cannot receive the broadcast message is determined 406. Let us denote the determined amount of resources as $R_{combined}$.

Additionally, unicast resources needed to transmit the message as a unicast to all vehicular recipients are also determined 408. Let us denote the determined amount of resources as $R_{unicast}$.

The two determined resource amounts are compared and the transmission combination leading to the lower amount of resources is executed 410. That is, if $R_{combined} < R_{unicast}$, then the message is broadcasted on cell level and also sent in unicast mode individually to each of those target vehicular recipients for which broadcast was evaluated as not usable in step 400. Otherwise, the message is sent to all target vehicles using unicast.

If the cell level broadcast mechanism (such as SC-PTM) used in the radio access network is capable of dynamically varying the modulation and coding scheme MCS used for broadcasting, then the procedure described in connection with FIG. 4 may be executed separately for all potential broadcast MCSs. For each potential cell level broadcast MCS, the process of FIG. 4 yields a decision among different transmission schemes and the amount of resources required to carry out the decision (sum of broadcast and/or unicast resources according to the decision taken for the broadcast MCS). Among all potential broadcast MCSs, the one resulting in the lowest amount of resources is selected as the MCS to be used by the cell level broadcast mechanism for the message, and the corresponding transmission scheme decision is selected to carry out the message transmission.

The proposed procedure solves the optimization problem that increasing the efficiency of the broadcast MCS reduces the amount of resources used for broadcast but at the same time increases the number of vehicular recipients that presumably cannot decode the broadcast message and thus increases the amount of resources used by proactive unicast. The optimal broadcast MCS that results in the minimum of broadcast plus unicast resources is the most efficient MCS.

It may be noted that with certain (usually highly efficient) MCSs the decision may be to not use broadcast at all as no vehicular recipient is estimated to be able to decode it; in this case the amount of broadcast resources is determined as zero. Similarly, with certain (usually highly robust, i.e., hardly efficient) MCSs the decision may be to use broadcast only as all vehicular recipients are estimated to receive the broadcast successfully; in this case the amount of unicast resources is determined as zero.

Above the vehicular recipients than cannot receive the broadcast message are estimated prior transmitting the broadcast message. This estimation can be done in various ways.

In an embodiment, radio channel estimation is performed for each vehicular recipient and the vehicular recipients than cannot receive the broadcast message are estimated on the basis of the radio channel estimation.

In an embodiment, channel feedback from vehicular recipient terminals is utilised in obtaining radio channel estimation. One challenge related to this is that the terminal does not report any state information to the eNodeB about the radio resources directly used for broadcasting messages. However, the terminal may have additional established data radio bearers (default or dedicated) besides receiving broadcast information, such as a data radio bearer for vehicular infotainment, maps downloads, for example. Therefore, the channel quality information, CQI, reports of the terminal that were sent for its data radio bearers in previous transmission time intervals for the same physical radio blocks on which broadcast is to be scheduled in the current or later transmission time interval may be utilised. This is because SC-PTM in a cell generally uses the same Physical Downlink Shared Channel, PDSCH, for broadcast as for unicast data radio bearer transmission. Thus the same physical radio block may be scheduled for a given data radio bearer transmission in one transmission time interval and for cell level broadcast in a later transmission time interval.

As long as the terminal has reported a CQI for the same physical radio blocks not earlier than the channel coherence time (detectable by the eNodeB), the CQI reports related to a data radio bearer may be treated as a still valid estimate of the channel condition of the terminal for the broadcast reception. In case the MCS used for broadcasting is robust enough compared to the MCS the CQI is related (i.e., broadcast uses the same or lower modulation order and uses the same or lower coding rate), broadcast transmission is likely to be usable for the terminal.

In an embodiment, the broadcast transmission may be considered to be usable if the modulation and/or the coding are more robust than the MCS used when CQI was related to so that the lack of HARQ in broadcast may be compensated.

In an embodiment, information on the location and mobility of each vehicular recipient may be determined. The vehicular recipients that cannot likely receive the broadcast message may be determined on the basis of the location and mobility information. The location, speed and other such data may be available for vehicle terminals from the periodic CAM messages transmitted by the them. For example, cell edge vehicle terminals or vehicle terminals within a certain geo-area may be excluded from broadcasting. Impacted areas may be defined by the eNodeB by correlating the CQI reports received for data radio bearers with the location of the reporting vehicle terminal and detecting if at certain locations there is usually poor channel quality not suitable for broadcast. The eNodeB may also observe the location of the handovers to check if a vehicular terminal is moving towards a cell edge (i.e., to be handed over soon) and may select unicast for such cases.

In an embodiment, channel feedback and quality of service information from other terminals using same transmission resources in the same coverage area may be utilised in obtaining radio channel estimation. Channel quality info ration transmitted by other terminals that are connected to the same cell and recently have used the same physical resource blocks that are to be assigned for broadcast may be taken into account in the estimation of the downlink broadcast usability for a given vehicular. The other terminals used for estimation should be co-located with the vehicular terminal for which the estimation is made so that the reported radio channels correlate with the possible broadcast transmission.

In an embodiment, the other terminals may be the user terminals of the driver or that of passengers of the vehicle where the vehicular terminal is installed as these devices are moving along the vehicle on the exact same trajectory. The detection of mobile terminals that are moving in the same vehicle is possible based on collecting device sensor information (e.g., at the same edge computing platform running the invention), mobility analytics (similarity detection in real time trajectories), explicit device-vehicle synchronization, for example. When the co-located devices are detected, their CQI reports may be utilized to evaluate the usability of broadcast transmissions for the vehicular terminal.

In an embodiment, certain cell level broadcast mechanisms (such as LTE SC-PTM in feedback mode) may enable that the terminals measure the channel quality over the resources used for broadcasting and report it back to the eNodeB in a similar manner as standard CQI reports of data radio bearers. If such a report is available, it may be utilised when evaluating the usability of broadcast for each terminal.

FIG. 5A is a flow chart illustrating an embodiment. FIG. 5A illustrates an example of reactive unicast method. In an embodiment, unicast transmission is used as a backup retransmission mechanism after initially broadcasting a message to the target vehicular recipients. The vehicular recipients than cannot receive the broadcast message are determined after transmitting the broadcast message on the basis of feedback received from the vehicular recipients. The steps may be executed by the server 112 of FIG. 1 or by another network entity (such as a radio access network node like LTE eNodeB or 5G gNodeB (such as 106A or 106B in FIG. 1), a processing device and application attached to the radio access network like an edge cloud or an in-line network element) or more than one entity in co-operation.

The two first steps 300 are the same as in connection with FIG. 3.

In step 300, the apparatus or network element in a radio access network receives a message from a vehicle via unicast uplink transmission. The message may be CAM or DENM or any other kind of message.

In step 302, the apparatus or network element is configured to determine the vehicular recipients of a message in one or more coverage areas are determined. The coverage areas in question may comprise one or more cells of the radio access network, including the cell wherefrom the message originated. The vehicular recipients may be vehicles determined on the basis of the geographical location of the vehicles, belonging to one or more cells or belonging to a given group, for example.

In step 500, the apparatus or network element is configured to, in each cell or coverage area with one or more target vehicular recipients, transmit the message as a single broadcast message to the vehicular recipients in each coverage area so that it may be received by all target vehicular recipients or vehicles. The modulation and coding scheme, MCS, used for the broadcast and the way it is selected is transparent and irrelevant for reactive unicast. For example, it may use a fixed (pre-configured) MCS or may use dynamic and adaptive broadcast MCS selection based on any criteria.

In step 502, the apparatus or network element is configured to receive feedback from the vehicular recipients regarding reception of the broadcast message. In an embodiment, the feedback from each vehicular recipient to the network on the success of receiving the broadcast message may be implemented as a repeat request indication (a dedicated control plane message or an information element inserted in an existing control plane message) similarly to the ACK/NACK (Acknowledgement/Negative Acknowledgement) feedback mechanism used by the standard HARQ-ACK mechanism of the LTE MAC entities, for example.

In step 504, the apparatus or network element is configured to determine the vehicular recipients than did not receive the broadcast message on the basis of feedback received from the vehicular recipients. The apparatus or network element may be configured to, collect a binary (yes/no) feedback from each vehicular recipient that indicates whether the vehicular recipient was able to receive the broadcast message.

In step 506, the apparatus or network element is configured to transmit the message as unicast to the vehicular recipients that did not receive the broadcast message. Thus, the number of unicast messages equals the number of vehicular recipients that reported failure to receive the broadcast message.

FIG. 5B is a flow chart illustrating an embodiment. FIG. 5B illustrates an example of reactive unicast method from a vehicular recipient or user terminal point of view.

In step 510, the vehicular recipient or user terminal is configured to receive a broadcast message from the network the user terminal is connected to. The broadcast may have been transmitted by the apparatus executing the steps of FIG. 5A.

In step 512, the vehicular recipient or user terminal is configured to determine whether the broadcast message was received successfully. In an embodiment, the successful reception may be determined from the ability of the vehicular recipient or user terminal to decode the broadcast message.

In step 514, the vehicular recipient or user terminal is configured to transmit feedback to the network on the basis of the determination. In an embodiment, the feedback from each vehicular recipient to the network on the success of receiving the broadcast message may be transmitted as a repeat request indication (a dedicated control plane message or an information element inserted in an existing control plane message) similarly to the ACK/NACK (Acknowledgement/Negative Acknowledgement) feedback mechanism used by the standard HARQ-ACK mechanism of the LTE MAC entities, for example.

In step 516, the vehicular recipient or user terminal is configured to receive a unicast message from the network, if the broadcast message was not received successfully.

The advantage of the reactive unicast method is that unicast is used based on real data received from vehicular recipients about the success/failure of receiving the broadcast message. This eliminates the number of unnecessary unicast messages. An unnecessary unicast message may be sent with proactive unicast with a conservative estimation. For example, estimation could predict that a vehicular recipient cannot likely receive the broadcast but in reality the vehicular recipient would still be able to decode the broadcast message. Additionally, reactive unicast guarantees the successful delivery of the message (as unicast is used for all vehicles that reportedly could not decode broadcast). With proactive unicast the successful delivery depends on the quality of the estimation process. On the other hand, reactive unicast introduces a round-trip time delay between the broadcast message and the potential unicast retransmission, whereas with proactive unicast the vehicular recipients that cannot decode the broadcast message can still receive the information at the same time via unicast. Therefore, the two methods may be used in a complementary way, e.g., for urgent messages proactive unicast with conservative estimation can be used to minimize the delay of receiving the information, whereas reactive unicast may be used for other messages to minimize the number of unicast retransmissions.

In an embodiment, proactive and reactive unicast may also be used in combination. For example, proactive unicast may be used to maximize the probability of successful message reception with no additional delay and additional reactive unicast may be used to guarantee delivery within the additional round-trip time delay.

In an embodiment, the total demand of vehicular and non-vehicular traffic in the same cell may be taken into account when determining transmission scheme (proactive unicast or reactive unicast method). The demand of a given traffic (vehicular, over-the-top, for example) may be quantified by the amount of resources (such as physical resource blocks) needed to serve the traffic. In case the demand of sending a message as individual unicast for all vehicular recipients plus the demand of all other traffic is lower than the total available resources, all (vehicular and non-vehicular) demand can be served by the cell even if all vehicular recipients receive individual unicast messages. In that case, it is affordable to simply send the message for all vehicles via individual unicast transmission (without involving broadcast at all) to maximize the resiliency and minimize the delay of receiving the message as the amount of resources consumed by the unicast transmissions has no impact on the service of any other non-vehicular traffic.

FIG. 6 illustrates an embodiment. The figure illustrates a simplified example of an apparatus or network element applying embodiments of the invention. In some embodiments, the apparatus may be a network element or a part of a network element.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

In an embodiment, the apparatus is the server 112 of FIG. 1. In FIG. 1, the apparatus is connected to SAE Gateway 100. However, the apparatus may be connected to other network elements as well. The apparatus may be operatively connected to SAE Gateway 100 or other network elements of a radio access network. The apparatus may be realised with distributed computing, i.e. the functions performed by the apparatus may be realised by a multitude of separate apparatuses connected to each other.

The apparatus 112 of the example includes a control circuitry 600 configured to control at least part of the operation of the apparatus.

The apparatus may comprise a memory 602 for storing data. Furthermore the memory may store software 604 executable by the control circuitry 600. The memory may be integrated in the control circuitry.

The apparatus further comprises one or more interface circuitries 606 configured to connect the apparatus to other devices and network elements of the radio access network. The interface may provide a wired or wireless connection.

In an embodiment, the software 604 may comprise a computer program comprising program code means adapted to cause the control circuitry 602 of the apparatus to realise the embodiments described above.

FIG. 7 illustrates an embodiment. The figure illustrates a simplified example of an apparatus applying embodiments of the invention. In some embodiments, the apparatus may be a vehicular recipient or terminal 108A-108D or 110A-110C or a user terminal.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 108A of the example includes a control circuitry 700 configured to control at least part of the operation of the apparatus.

The apparatus may comprise a memory 702 for storing data. Furthermore the memory may store software 704 executable by the control circuitry 700. The memory may be integrated in the control circuitry.

The apparatus may comprise one or more interface circuitries 706. The interface circuitry is operationally connected to the control circuitry 700. The interface circuitry may be a transceiver configured to communicate with a base station of communication network. It may be connected to an antenna arrangement (not shown). The apparatus may also comprise a connection to a transceiver instead of a transceiver.

In an embodiment, the software 704 may comprise a computer program comprising program code means adapted to cause the control circuitry 702 of the apparatus to realise the embodiments described above.

An embodiment provides an apparatus as described in connection with FIG. 6 and one or more apparatuses described in connection with FIG. 7.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A method in a network element of in a radio access network for transmitting a message for multiple vehicular recipients, the method comprising:
   determining the vehicular recipients of the message in one or more coverage areas;
   performing radio channel estimation for each vehicular recipient;
   estimating the amount of radio resources needed in transmission the message using broadcast or separate unicast messages or, based on radio channel estimation, the number of vehicular recipients that cannot receive broadcast message, or both;
   if the estimating indicates that some of the vehicular recipients can receive the broadcast message and some cannot, determining combined radio resources needed to transmit the message as a broadcast and as a unicast to each vehicular recipient that cannot receive the broadcast message and determining unicast radio resources needed to transmit the message as a unicast to all vehicular recipients; and transmitting the message either as a single broadcast message to the vehicular recipients in each coverage area or as a unicast message separately to each vehicular recipient or both, based on minimizing the amount of radio resources needed in transmission or the number of vehicular recipients that cannot receive the broadcast message, or both, wherein the transmitting the message comprises transmitting the message using both broadcast and unicast to each vehicular recipient that cannot receive the broadcast message, if combined radio resources are smaller than unicast radio resources, otherwise transmitting the message using unicast for all vehicular recipients.

2. The method of claim 1, further comprising:

utilizing channel feedback from vehicular recipients in obtaining radio channel estimation.

3. The method of claim 1, further comprising:

utilizing channel feedback and quality of service information from other terminals using same transmission resources in the same coverage area in obtaining radio channel estimation.

4. The method of claim 1, further comprising:

determining information on location and mobility of each vehicular recipient; and estimating the vehicular recipients that cannot receive the broadcast message on the basis of the location and mobility information.

5. The method of claim 1, wherein the message to be transmitted is based on an uplink message, received at the network element prior to the determining vehicular recipients, from a vehicular transceiver via unicast uplink transmission.

6. The method of claim 5, wherein the uplink message comprises a Cooperative Awareness Message or a Decentralized Environmental Notification Message.

7. An apparatus in a radio access network for transmitting a message for multiple vehicular recipients, said apparatus comprising:

at least one processor; and at least one memory including computer program code, the at least one memory and the computer program code configured to, with the at least one processor, cause the apparatus at least to perform:

determining the vehicular recipients of the message in one or more coverage areas;

performing radio channel estimation for each vehicular recipient;

estimating the amount of radio resources needed in transmission the message using broadcast or separate unicast messages or, based on radio channel estimation, the number of vehicular recipients that cannot receive broadcast message, or both;

if the estimating indicates that some of the vehicular recipients can receive the broadcast message and some cannot, determining combined radio resources needed to transmit the message as a broadcast and as a unicast to each vehicular recipient that cannot receive the broadcast message and determining unicast radio resources needed to transmit the message as a unicast to all vehicular recipients; and transmitting the message either as a single broadcast message to the vehicular recipients in each coverage area or as a unicast message separately to each vehicular recipient or both, based on minimizing the amount of radio resources needed in transmission or the number of vehicular recipients that cannot receive the broadcast message, or both, wherein the transmitting the message comprises transmitting the message using both broadcast and unicast to each vehicular recipient that cannot receive the broadcast message, if combined radio resources are smaller than unicast radio resources, otherwise transmitting the message using unicast for all vehicular recipients.

8. A system in a radio network for transmitting a message for multiple vehicular recipients, comprising one or more apparatuses, each apparatus comprising:

at least one processor; and at least one memory including computer program code, the at least one memory and the computer program code configured to, with the at least one processor, cause the apparatus at least to perform:

determining the vehicular recipients of the message in one or more coverage areas;

performing radio channel estimation for each vehicular recipient;

estimating the amount of radio resources needed in transmission the message using broadcast or separate unicast messages or, based on radio channel estimation, the number of vehicular recipients that cannot receive broadcast message, or both;

if the estimating indicates that some of the vehicular recipients can receive the broadcast message and some cannot, determining combined radio resources needed to transmit the message as a broadcast and as a unicast to each vehicular recipient that cannot receive the broadcast message and determining unicast radio resources needed to transmit the message as a unicast to all vehicular recipients; and transmitting the message either as a single broadcast message to the vehicular recipients in each coverage area or as a unicast message separately to each vehicular recipient or both, based on minimizing the amount of radio resources needed in transmission or the number of vehicular recipients that cannot receive the broadcast message, or both, wherein the transmitting the message comprises transmitting the message using both broadcast and unicast to each vehicular recipient that cannot receive the broadcast message, if combined radio resources are smaller than unicast radio resources, otherwise transmitting the message using unicast for all vehicular recipients.

9. A computer program product embodied on a non-transitory computer-readable medium, said computer program comprising program instructions which, when loaded into an apparatus, cause the apparatus to execute the method according to claim 1.

10. The apparatus of claim 7, the at least one memory and the computer program code further configured to, with the at least one processor, cause the apparatus at least to perform:

utilizing channel feedback from vehicular recipients in obtaining radio channel estimation.

11. The apparatus of claim 7, the at least one memory and the computer program code further configured to, with the at least one processor, cause the apparatus at least to perform:

utilizing channel feedback and quality of service information from other terminals using same transmission resources in the same coverage area in obtaining radio channel estimation.

12. The apparatus of claim 7, the at least one memory and the computer program code further configured to, with the at least one processor, cause the apparatus at least to perform:

determining information on location and mobility of each vehicular recipient; and estimating the vehicular recipients that cannot receive the broadcast message on the basis of the location and mobility information.

13. The apparatus of claim 7, wherein the message to be transmitted is based on an uplink message, received at the apparatus prior to the determining vehicular recipients, from a vehicular transceiver via unicast uplink transmission.

14. The apparatus of claim 13, wherein the uplink message comprises a Cooperative Awareness Message or a Decentralized Environmental Notification Message.

* * * * *